United States Patent Office 3,453,317
Patented July 1, 1969

3,453,317
UNSATURATED CARBONYL COMPOUNDS AND PROCESSES
Roman Marbet and Gabriel Saucy, Riehen, Switzerland, assignors to Hoffman-La Roche Inc., Nutley, N.J., a corporation of New Jersey
No Drawing. Continuation-in-part of application Ser. No. 290,960, June 27, 1963. This application Oct. 30, 1963, Ser. No. 319,980
Claims priority, application Switzerland, July 11, 1962, 8,339/62; Sept. 12, 1962, 10,828/62
Int. Cl. C07c 45/16, 45/00
U.S. Cl. 260—476    4 Claims This application is a continuation-in-part of application Ser. No. 290,960, filed June 27, 1963.

The present invention relates to processes for the preparation of γ,δ-unsaturated carbonyl compounds, and more particularly to processes for the preparation of γ,δ-unsaturated aldehydes and ketones of the formula

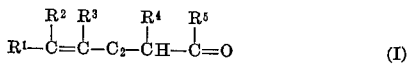
(I)

wherein $R^1$ is a saturated or unsaturated hydrocarbon group, an aralkyl group, preferably a phenyl lower alkyl group, or an aryl group, preferably phenyl, and where the group is other than aryl, it can also carry an oxygen-containing substituent attached to an aliphatic carbon atom; $R^2$ is a lower aliphatic hydrocarbon group, preferably a lower alkyl group; $R^3$, $R^4$, and $R^5$ are hydrogen atoms or a lower aliphatic hydrocarbon group, preferably a lower alkyl or lower alkenyl group; and $R^1$ taken together with $R^2$, and $R^4$ taken together with $R^5$ can form a closed ring.

Examples of $R^1$ groups include the following saturated and unsaturated hydrocarbon groups: lower alkyl and lower alkenyl groups, e.g., methyl, ethyl, propyl, isopropyl, butyl, isobutyl, 3,4-dimethyl-phenyl, 3,4-dimethyl-penten-3-yl, higher alkyl and alkenyl groups, e.g., a group of the formula

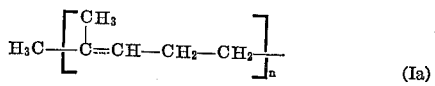
(Ia)

wherein n is a whole number from 1–8, inclusive, and the bond illustrated dotwise can also be hydrogenated. 4,7,8-trimethyl-nonyl, 4,7,8 - trimethyl-nonadien-3,7-yl, etc., as well as lower and higher alkyl and alkenyl groups such as the above, or an aralkyl group, carrying an oxygen-containing substituent attached to an aliphatic carbon atom, specifically, a free, esterified, or etherified hydroxy group. Esterified hydroxy groups include acyloxy groups in which the acyl group is from a lower aliphatic acid or an aromatic carboxylic acid such as formic acid, acetic acid, propionic acid, butyric acid, etc., or benzoic acid. Etherified hydroxy groups are preferably lower alkoxy groups, e.g., methoxy, propoxy, isopropoxy, etc., or aryloxy groups such as phenyloxy, etc. Specific examples of oxygen-containing $R^1$ groups include hydroxymethyl, acetoxyethyl, methoxypropyl, 4-hydroxy (or methoxy or actoxy)-4-methylpentyl, 8-hydroxy (or methoxy or acetoxy)-4,8 - dimethyl-nonyl, 8-hydroxy (or methoxy or acetoxy) - 4,8 - dimethyl-nonen-3-yl, 4-hydroxy (or methoxy or acetoxy)-3,4-dimethyl-pentyl, etc. When the $R^1$ group contains an oxygen-containing substituent, the elements making up the $R^1$ group are only carbon, hydrogen, and one oxygen atom. When the $R^1$ group does not contain an oxygen-containing substituent, the elements making up the $R^1$ group are carbon and hydrogen only.

Examples of lower aliphatic hydrocarbon groups which can be the $R^2$, $R^3$, $R^4$, and $R^5$ groups are preferably, lower alkyl and lower alkenyl groups having from 1 to 8 carbon atoms, e.g., methyl, ethyl, propyl, isopropyl, allyl, butyl, pentyl, etc.

As above noted, $R^1$ with $R^2$, and $R^4$ with $R^5$, can also form rings. Examples of such rings are especially carbocyclic 5- and 6-membered rings containing only the elements carbon and hydrogen, e.g., $R^1$ together with $R^2$ can form a tetramethylene or pentamethylene group and $R^4$ together with $R^5$ can form a trimethylene or tetramethylene group.

Preferred novel compounds prepared by the process of the invention, and to which the invention is also directed, are aldehydes of the formula

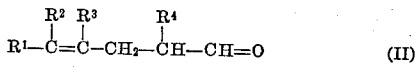
(II)

wherein $R^1$, $R^2$, $R^3$, and $R^4$ have the meanings given above (except, of course, $R^4$ cannot be part of a ring), and wherein the total number of carbon atoms is at least 8.

The process of the invention is carried out by reacting a tertiary allyl alcohol, particularly, one of the formula

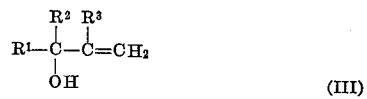
(III)

wherein $R^1$, $R^2$, and $R^3$ have the meaning given above for Formula I, in the presence of an acidic catalyst, with either (a) an enol ether of an aliphatic aldehyde or ketone, especially with an enol ether of the formula

(IVa)

or (b) an acetal or ketal of an aliphatic aldehyde or ketone, especially with an acetal or ketal of the formula

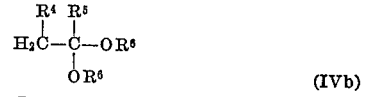
(IVb)

wherein the Formulae IVa and IVb $R^6$ is an alkyl group, preferably a lower alkyl group, and $R_4$ and $R_5$ have the meaning given above for Formula I.

The following tertiary allyl alcohols are examples of allyl alcohols of Formula III that can be used as starting materials in accordance with the invention:

3-methyl-1-buten-3-ol;
2,3-dimethyl-1-buten-3-ol;
3-methyl-1-penten-3,5-diol;
3-methyl-1-penten-3-ol;
3,5-dimethyl-1-hexen-3-ol;
3-phenyl-1-buten-3-ol;
1-vinyl-1-cycohexanol;
1-vinyl-1-cyclopentanol;
3,7-dimethyl-1,6-octadien-3-ol (linalool);
3,7-dimethyl-1-octen-3,7-diol;
3,6,7-trimethyl-1,6-octadien-3-ol;
3,7-dimethyl-1-octen-3-ol;
3,6,7-trimethyl-1-octen-3-ol;
3,6,7-trimethyl-7-ethoxy-1-octen-3-ol;
3,7,11-trimethyl-1,6,10-dodecatrien-3-ol (nerolidol);
3,7,11-trimethyl-1-dodecaen-3-ol (tetrahydro-nerolidol);
isophytol;
3,7-dimethyl-7-methoxy-1-octen-3-ol (methoxylinalool);
etc.

Examples of enol ethers of the Formula IVa include the following ketone enol ethers: isopropenyl methyl ether; isopropenyl ethyl ether; 2-ethoxy-1-butene; 2-ethoxy-2-butene; 2-ethoxy-2-pentene; 3-ethoxy-3-pentene; 2-ethoxy-2,5-hexadiene; 1-cyclohexenyl butyl ether; and the following aldehyde enol ethers: vinyl methyl ether; vinyl ethyl ether; 1-propenyl ethyl ether; etc.

Examples of ketals of the Formula IV$b$ include acetone dimethyl ketal; acetone diethyl ketal; 2,2-dimethoxy-butane; 2,2-diethoxy-pentane; 3,3-dimethoxy-pentane; 4-methyl-2,2-diethoxy-pentane; 1,1-dimethoxy - cyclohexane; etc.

Examples of acetals of the Formula IV$b$ include acetaldehyde diethyl acetal; propionaldehyde dimethyl acetal; butyraldehyde diethyl acetal; enanthaldehyde diethyl acetal; etc.

If, as starting materials of the Formula IV$a$ or IV$b$ there are used those wherein $R^5$=hydrogen (that is to say, aldehyde enol ethers or acetals), then aldehydes are obtained as end products; if, on the other hand, as starting materials of the Formulae IV$a$ or IV$b$ there are used those with $R^5$=lower alkyl (that is to say, ketone enol ethers or ketals), then ketones are obtained as end products.

Phosphoric acid is a particularly suitable acidic catalyst for use in the process of the invention, i.e., for the reaction of a tertiary allyl alcohol with an enol ether or a ketal or acetal. The concentration of phosphoric acid in the reaction mixture is preferably in the range of about 0.01 to about 0.5 percent, most preferably, about 0.2 percent by weight of the reaction mixture. Other mineral acids can, however, also be used as catalyst, e.g., sulfuric acid, as well as strong organic acids, e.g., oxalic acid, trichloro-acetic acid, p-toluenesulfonic acid, etc. Acidic salts such as, for example, potassium bisulfite or so-called Lewis acids such as boron trichloride, boron trifluoride, zinc chloride, etc., can also be employed as the acidic catalyst.

The reaction in accordance with the invention is advantageously undertaken at elevated temperature (for example, above about 50° C.), conveniently at temperatures over about 100° C. Temperatures within the range of about 120 to about 200° C. are in general preferred.

The reaction can be carried out not only with but also without a solvent. As the solvent there can be used, for example, organic solvents, e.g., hydrocarbons such as hexane, cyclohexane, isooctane, benzene, toluene, petroleum ether, ligroin, etc.

It is, in general, advantageous to carry out the reaction of the starting materials under pressures above atmospheric. For this purpose the heating of the starting materials can be undertaken in a closed vessel. A further elevation of pressure can be achieved by the forcing in of an inent gas such as, for example, nitrogen. However, the reaction can also be carried out under atmospheric pressure for example, by heating the starting materials to reflux in the presence of one of the solvents named above.

Of course, the reaction time varies considerably with the reaction temperatures. In order to achieve optimum yields, the progress of the reaction is followed analytically, conveniently by the withdrawal of samples (for example, gas-chromatographically) and the heating is stopped as soon as the allyl alcohol component has reacted completely.

The $\gamma,\delta$-unsaturated corbonyl compound product of Formula I can be isolated from the mixture of the reaction products in a manner known per se; conveniently by fractional distillation. Prior to the distillation the acid catalyst is advantageously neutralized by addition of an inorganic or organic basic agent (such as sodium acetate, caustic soda, sodium carbonate, ammonia, a tertiary amine such as triethyl amine or pyridine, etc.) and thereafter removed from the reaction mixture if desired.

According to a preferred mode of carrying out the process in accordance with the invention, the tertiary allyl alcohol of the Formula III is reacted with a ketone or aldehyde enol ether of the Formula IV$a$, wherein from about 2 to about 2.1 moles of enol ether per mole of allyl alcohol are employed. In this case there is obtained as the reaction product, in addition to the $\gamma,\delta$-unsaturated ketone or aldehyde of Formula I, about 1 mole of the ketal or acetal (IV$b$) corresponding to the enol ether (IV$a$) introduced (resulting from the addition of 1 mole of alcohol $R^6OH$ to the excess enol ether IV$a$). The ketal or acetal (IV$b$) can once more be reconverted into the enol ether IV$a$ by the splitting off of $R^6OH$ (e.g., by means of pyrolysis), and the enol ether IV$a$ can again be used for the reaction in accordance with the invention.

If a ketal or acetal of the Formula IV$b$ is used in place of the preferred enol ether of the Formula IV$a$ for the reaction in accordance with the invention, the alcohol (2 moles $R^6OH$), which is formed in the reaction, should be continuously distilled off from the reaction mixture.

The reaction in accordance with the invention can also readily be carried out continuously, for example, by forcing the reaction mixture under pressure through a tube heated at a high temperature and maintaining a residence time which ensures the fullest possible reaction of the starting materials.

The allyl alcohols, enol ethers and ketals or acetals used as the starting materials, insofar as they do not concern already known materials, can be manufactured in accordance with methods known per se; the allyl alcohols of Formula III, for example, can be prepared by partial hydrogenation of the corresponding propargyl alcohols which, in turn, can be prepared by the addition of acetylene to the corresponding ketone; the ketals or acetals of the Formula IV$b$ can be prepared by a known ketalization or acetalization reaction of ketones and aldehydes, and the enol ethers of the Formula IV$a$ can be prepared from the ketals or acetals just named by the splitting off of alcohol.

The $\gamma,\delta$-unsaturated ketones and aldehydes of Formula I obtained in accordance with the invention can be used as odorants for perfumery purposes. The aldehydes of Formula II are particularly suitable for use as odorants in perfume compositions. The ketones of Formula I can also be used as intermediates for the manufacture of other chemical compounds such as, for example, substituted ionones, vitamins A, E, and $K_1$ or carotenoids.

EXAMPLE 1

86 g. of dry 3-methyl-1-buten-3-ol are mixed with 0.46 g. of phosphoric acid and 151 g. of isopropenyl methyl ether in a 400 ml. pressure-vessel. Thereupon a gauge pressure of 2 atm. is produced in the pressure-vessel by the introduction of nitrogen and the mixture heated to 125° C. (inside temperature) during the course of ½ to 1 hour. The gauge pressure rises first to about 7.5 atm. During the course of the reaction it falls to about 5 atm. The reaction mixture is held for 13–15 hours at 125° C. After cooling to room temperature, the reaction mixture is subjected to distillation after the addition of 1.25 g. of powdered sodium acetate. With bath temperatures of 90–160° (without vacuum) crude acetone dimethyl ketal (containing some acetone and isopropenyl methyl ether) first distills over. After continuing the distillation under a water-jet vacuum, there is obtained 6-methyl-5-hepten-2-one; $n_D{}^{20}$=1.4392; B.P. 59°/10 mm.

The reaction of 3-methyl-1-buten-3-ol with isopropenyl methyl ether to obtain 6-methyl-5-hepten-3-one can also be undertaken continuously by forcing the mixture of the starting materials under pressure through a tube heated at 180–200° C., and thereafter condensing the reaction mixture in a condenser.

EXAMPLE 2

86 g. of dry 3-methyl-1-buten-3-ol are mixed with 300 ml. of ligroin (B.P. 130–135° C.) and 150 mg. of p-toluenesulfonic acid (dissolved in 0.5 ml. of methanol) in a flask. 172 g. of isopropenyl ethyl ether are added to this mixture while stirring and the mixture is boiled under reflux for 14 hours (bath temperature 100° C.). Thereafter, the mixture is treated with 150 mg. of p-toluenesulfonic acid (dissolved in 0.5 ml. of methanol) and 86 g. of isopropenyl ethyl ether and again boiled under reflux for 8 hours (bath temperature 120° C., inside temperature ca. 100° C.). Then the p-toluenesulfonic acid is neutralized with 1.5 g. of sodium acetate and the reaction mixture is subjected to fractional distillation. Excess isopropenyl ethyl ether, followed by acetone diethyl ketal together with ligroin, and finally 6-methyl-5-hepten-2-one distills over; B.P.=59°/10 mm.; $n_D^{20}$=1.4392.

EXAMPLE 3

43 g. of dry 3-methyl-1-buten-3-ol are mixed with 0.3 g. of phosphoric acid and 104 g. of acetone dimethyl ketal in a pressure-vessel and thereafter 5 atm. of nitrogen are introduced. The mixture is heated at 150° C. for 15 hours and then worked up as described in Example 1. 34 g. of 6-methyl-5-hepten-2-one are obtained.

EXAMPLE 4

100 g. of dry 2,3-dimethyl-1-buten-3-ol are mixed with 0.5 g. of phosphoric acid and 150 g. of isopropenyl methyl ether in a pressure-vessel. Then 5 atm. of nitrogen are introduced. The reaction mixture is heated at 125° C. During this time the gauge pressure rises to 9 atm. The reaction mixture is held for 16 hours at a temperature of 125° C. and then cooled down to room temperature. After the addition of 1.5 g. of sodium acetate (for purpose of neutralization of the phosphoric acid), the mixture is subjected to distillation. With bath temperatures of 90–130° C. the resulting acetone dimethylketal (103 g., crude) first distills over. By subsequent distillation in a water-jet vacuum of 15 mm. there is obtained 5,6-dimethyl-5-hepten-2-one; B.P.=78–79°/15 mm.; $n_D^{20}$=1.4518.

EXAMPLE 5

51.3 g. of dry 3,5-dimethyl-1-hexen-3-ol are mixed with 0.2 g. of phosphoric acid and 62 g. of isopropenyl methyl ether in a 200 ml. pressure-vessel. Then 5 atm. of nitrogen are nitroduced. The reaction mixture is heated at 140° C., whereupon the pressure in the apparatus rises to 10–11 atm. The mixture is held for 15 hours at 140° C. and then cooled down to room temperature. 3,5-dimethyl-1-hexen-3-ol can no longer be detected gas-chromatographically. For purpose of working up, the reaction mixture is treated with 1 g. of sodium acetate and the resulting acetone dimethyl ketal is first distilled off with a slight water-jet vacuum (bath temperature about 90° C.). Subsequently, pure 6,8-dimethyl-5-nonen-2-one is distilled over rapidly under a vacuum of 16 mm. (bath temperature 120° C.); B.P.=98–99°/16 mm.; $n_D^{20}$=1.4456.

EXAMPLE 6

59.2 g. of dry-phenyl-1-buten-3-ol are mixed with 0.2 g. of phosphoric acid and 62 g. of isopropenyl methyl ether in a 200 ml. pressure-vessel. Then 5 atm. of nitrogen are introduced and the mixture is heated for 13 hours to 125° C. After cooling to room temperature, the mixture is treated with 1 g. of sodium acetate and then the acetone diemthyl ketal formed is first distilled off with a slight water-jet vacuum (bath temperature 100° C.). Then the 6-phenyl-5-hepten-2-one is distilled off in a high vacuum at 0.4 mm. as a colorless liquid; B.P. 97–99°/0.4 mm.; $n_D^{20}$=1.5395.

EXAMPLE 7

86 g. of 3-methyl-1-buten-3-ol are mixed with 210 g. of 2-ethoxy-butene (obtained by pyrolysis of 2,2-diethoxy-butane) and 0.5 g. of phosphoric acid in a 400 ml. pressure-vessel. The pressure-vessel is charged with 10 atm. of nitrogen and the reaction mixture is held for 15 hours at 125° C. After cooling to room temperature, the reaction product is treated with 2 g. of sodium acetate and then distilled. 147 g. of crude 2,2-diethoxy-butane are first separated (bath temperature 80° C.). Then a mixture of 3,6-dimethyl-5-hepten-2-one and 7 - methyl - 6 - octen - 3 - one is distilled under a water-jet vacuum (14 mm.); B.P.=70–76°/14 mm.; $n_D^{20}$=1.4414.

EXAMPLE 8

154 g. of 3,7-dimethyl-1,6-octadien-3-ol (linalool) are mixed with 150 mg. of p-toluenesulfonic acid, 200 g. of isopropenyl ethyl ether and 300 ml. of ligroin (B.P. 130–155° C.). The mixture is boiled under reflux for 8 hours (bath temperature 100° C.), thereafter treated once more with 150 mg. of p-toluenesulfonic acid and with 100 g. of isopropenyl ethyl ether, and held under reflux for a further 15 hours (bath temperature 110° C.). Linalool can now no longer be detected thin-layer chromatographically. After the addition of 1.5 g. of sodium acetate, the isopropenyl ethyl ether in excess and the resulting acetone diethyl ketal are first distilled off together with the ligroin (bath temperatures 80–120° C.; vacuum 100 mm.–15 mm.). 150 g. of crude 6,10-dimethyl-5,9-undecadien-2-one (geranylacetone) are obtained as the residue, from which pure geranylacetone can easily be isolated by distillation; B.P.=66–69° C./0.03 mm.; $n_D^{20}$=1.4670.

EXAMPLE 9

123 g. of linalool are mixed with 0.48 g. of phosphoric acid and 120 g. of isopropenyl methyl ether in a 400 ml. pressure-vessel. After the introduction of 5 atm. of nitrogen, the mixture is held for 16 hours at a temperature of 125° C., then cooled and treated with 1.5 g. of sodium acetate (for the purpose of neutralization of the phosphoric acid). The resulting crude acetone dimethyl ketal is distilled off at 100 mm. The residue consists of crude geranylacetone with $n_D^{20}$=1.4668. By distillation there is obtained pure geranylacetone of B.P.=66–69° C./0.03 mm.; $n_D^{20}$=1.4670.

EXAMPLE 10

140.4 g. of 3,7-dimethyl-1-octen-3-ol are mixed with 0.5 g. of phosphoric acid and 136 g. of isopropenyl methyl ether in a pressure-vessel. After the introduction of 5 atm. of nitrogen, the mixture is held for 14 hours at 125° C., then cooled and treated with 1.5 g. of sodium acetate. The resulting acetone dimethyl ketal is distilled off in the water-jet vacuum and thereafter the pure 6,10-dimethyl-5 - undecaen - 2 - one is obtained in the high vacuum; B.P.=79–83° C./0.13 mm.; $n_D^{20}$=1.4488.

EXAMPLE 11

68 g. of 3,6,7-trimethyl-1-octen-3-ol are mixed with 0.25 g. of phosphoric acid and 60 g. of isopropenyl methyl ether in a pressure-vessel. After the introduction of 4 atm. of nitrogen the mixture is held for 18 hours at 124° C., then cooled and treated with 1 g. of sodium acetate. The resulting acetone dimethyl ketal is distilled off. Pure 6,9,10-trimethyl-5-undecaen-2-one is obtained from the remaining residue (80 g.) by distillation; B.P.=65–72° C./0.05 mm.; $n_D^{20}$=1.4576.

EXAMPLE 12

155 g. of 3,7,11-trimethyl-1,6,10-dodecatrien-3-ol(nerolidol) are mixed with 0.5 g. of phosphoric acid and 105 g. of isopropenyl methyl ether in a pressure-vessel. After the introduction of 6 atm. of nitrogen, the mixture is held for 16 hours at 125° C. After the addition of 1.5 g. of sodium acetate, the resulting acetone dimethyl ketal is first distilled off. 183 g. of crude 6,10,14-trimethyl-5,9,13-pentadecatrien-2-one (farnesylacetone) with $n_D^{20}$=1.4794, which is purified by distillation, remain in the residue. B.P.=109–111° C./0.07 mm.; $n_D^{20}$=1.4815.

EXAMPLE 13

86 g. of 3-methyl-1-buten-3-ol are mixed with 0.5 g. of phosphoric acid and 151 g. of vinyl ethyl ether in a pressure-vessel. After the introduction of 5 atm. of nitrogen, the mixture is held for 2 hours at an inside temperature of 150° C. 2 ml. of triethyl amine are added to the cooled reaction product and the resulting acetaldehyde diethyl acetal is first distilled off at 100 mm. and a bath temperature of 90° C. by distillation of the residue (bath temperature 120° C., vacuum 50–100 mm.) there are obtained 5-methyl-4-hexen-1-al as a colorless, very intensely smelling liquid; B.P.=90°/100 mm.; $n_D^{20}$=1.4376; melting point of the 4-phenylsemicarbazone=123° C. (from methanol).

EXAMPLE 14

86 g. of 3-methyl-1-buten-3-ol are mixed with 0.5 g. of phosphoric acid and 181 g. of propenyl ethyl ether (CH$_3$—CH=CH—O—CH$_2$—CH$_3$) in a pressure-vessel. After the introduction of 5 atm. of nitrogen, the mixture is held for 1 hour at 150° (inside temperature). It can be determined gas-chromatographically that the methyl-butenol has disappeared completely after this time. The same results are achieved without the use of gauge pressure when the above reaction mixture is heated under reflux (bath temperature 100° C.) for 48 hours.

After having completed the reaction, the phosphoric acid is neutralized with 2 ml. of triethyl amine and then the resulting propionaldehyde diethyl acetal is first distilled off at 100 mm. and a bath temperature of 100° C. By distillation at 17 mm., 2,5-dimethyl-4-hexen-1-al is subsequently obtained as a strongly smelling liquid. Odor characteristics: strongly fruit-like, slightly fatty; in the line of octyl alcohol and octyl aldehyde; lingering smell-delicately grassy. B.P.=59° C./17 mm.; $n_D^{20}$=1.4393; melting point of the 4-phenylsemicarbazone=89° C. (from methanol).

EXAMPLE 15

154 g. of linalool are held in a pressure-vessel with 0.6 g. of phosphoric acid and 151 g. of vinyl ethyl ether under a nitrogen gauge pressure of 5 atm. for 17 hours at a temperature of 120° C. (One can also heat at 150° C. for 3 hours with approximately the same result.) Thereafter, the phosphoric acid is neutralized with 2.4 ml. of triethyl amine and then the resulting acetaldehyde diethyl acetal is first distilled off on the steam-bath. The residue is fractionally distilled in a high vacuum. There is obtained pure 5,9-dimethyl-4,8-decadien-1-ol as a colorless liquid of individual, very clinging smell. Odor characteristics: mellow, fatty, somewhat fruit-like smoky smell which is reminiscent of lauric and tetradecyl aldehyde. This compound completes the series of the fatty aldehydes which are so important in perfumes of today and allows the production of "cloudy" effects; moreover, this compound is useful as an intermediate for the manufacture of synthetic costus-root, tuber rose or jasmine oils—excellent clinging quality. B.P.=69° C./0.04 mm.; $n_D^{20}$=1.4678; melting point of the 4-phenylsemicarbazone=58° C. (from methanol).

EXAMPLE 16

51 g. of 1-vinyl-1-cyclohexanol are mixed with 0.25 g. of phosphoric acid and 16 g. of vinyl ethyl ether in a pressure-vessel. After the introduction of 5 atm. of nitrogen, the mixture is heated at 150° C. for 3 hours. Vinyl-cyclohexanol can now no longer be detected in the gas-chromatogram. The resulting acetaldehyde diethyl acetal is evaporated on the steam-bath at 15 mm. The remaining oily residue is mixed up by stirring with a solution of 300 g. of sodium sulfite in 1500 ml. of water. The pH is adjusted to 7 by the addition of 50 ml. of acetic acid and the mixture is stirred for 1 hour. Then the mixture is diluted with 2000 ml. of water and the non-aldehydic portion is extracted with petroleum ether. Now the pure 4-cyclohexylidene-1-butanal is liberated from the clear aqueous solution with 100 ml. of 30 percent caustic soda. This aldehyde is now extracted with petroleum ether. It is obtained as a colorless pleasantly smelling oil. Odor characteristics: fruit-like, herbal, slightly fatty and with an impression which is reminiscent of butyl alcohol; useful as a modifier for modern spice-perfumes, birch-tar, gardenia, geraniums, etc. B.P.=56–58°/0.04 mm. $n_D^{20}$=1.4829. Melting point of the 4-phenylsemicarbazone=120° C.

EXAMPLE 17

86 g. of 3-methyl-1-buten-3-ol are mixed with 0.8 g. of phosphoric acid and 323 g. of 1-cyclohexenyl butyl ether in a pressure-vessel. After the introduction of 2 atm. of nitrogen, the reaction mixture is held for 2 hours at 150° C. (inside temperature). Thereafter, the cooled mixture is treated with 2 ml. of triethyl amine and it is subjected to distillation at 19 mm. Below 100° C. the cyclohexanone dibutyl ketal passes over and then the 2-[3'-methyl-2'-butenyl]-cyclohexanone, smelling harsh and celery-like passes over. B.P.=129° C./19 mm.; $n_D^{20}$=1.4786.

EXAMPLE 18

86 g. of 3-methyl-1-buten-3-ol are heated to 150° C. for 15 hours in a pressure-vessel (without nitrogen gauge pressure) with 0.6 g. of phosphoric acid and 118 g. of acetaldehyde diethyl acetal. After the working up as previously described, there is obtained 5-methyl-4-hexen-1-al including unchanged methylbutenol.

EXAMPLE 19

In a pressure-vessel under 5 atm. of nitrogen pressure, 100 g. of 2,3-dimethyl-1-buten-3-ol, 0.5 g. of phosphoric acid, and 152 g. of vinyl ethyl ether are heated for one hour at 150° C. The cooled reaction mixture is worked up by treatment with 2 ml. of triethylamine followed by distillation in a 70° C. heating bath. Acetaldehyde diethylacetal distills off first at 100 mm. pressure. Thereafter at 9 mm. pressure, pure 4,5-dimethyl-4-hexen-1-al distills off as a colorless liquid; $n_D^{20}$=1.4484. Odor: strong, rancid-fatty. Boiling point: 53°/9 mm.

EXAMPLE 20

In a pressure-vessel, 80 g. of 2,3-dimethyl-1-buten-3-ol, 0.4 g. of phosphoric acid and 146 g. of propenyl ethyl ether are heated together for one hour at 150° C. After working up according to the process of Example 19, pure 2,4,5-trimethyl-4-hexen-1-al is obtained as a colorless liquid of boiling point 55°/8 mm.; $n_D^{20}$=1.4496. Odor: clean-fruity, ivy- and tangerine-like.

EXAMPLE 21

In a pressure-vessel under 2 atm. of nitrogen, 102 g. of 3,5-dimethyl-1-hexen-3-ol, 0.4 g. of phosphoric acid, and 122 g. of vinyl ethyl ether are heated for 30 minutes at 200° C. (the pressure climbs to about 16 atm.). After working up according to the process of Example 19, pure 5,7-dimethyl-4-octen-1-al is obtained as a colorless liquid of boiling point 75–76°/10 mm.; $n_D^{20}$=1.4450. Odor: rancid-fatty, finer than 4,5-dimethyl-4-hexen-1-al.

EXAMPLE 22

In a pressure-vessel, 90 g. of 3,5-dimethyl-1-hexen-3-ol, 0.35 g. of phosphoric acid, and 128 g. of propenyl ethyl ether are heated together for one hour at 200° C. After working up according to the process of Example 19, pure 2,5,7-trimethyl-4-octen-1-al is obtained as a colorless oil of boiling point 91–92°/15 mm.; $n_D^{20}$=1.4472. Odor: fresh-fruity, lightly fatty.

EXAMPLE 23

In a pressure-vessel, 108 g. of linalool, 0.5 g. of phosphoric acid, and 127 g. of propenyl ether are heated together for one hour at 180° C. After working up according to the process of Example 19, including distillation under high vacuum, pure 2,5,9-trimethyl-4,8-decadien-1-al is obtained as a colorless oil of boiling point 74–75°/0.08 mm.; $n_D^{20}$=1.4682. Odor: pleasantly fresh-fruity, lightly fatty.

EXAMPLE 24

In a pressure-vessel, 125 g. of dihydrolinalool (3,7-dimethyl-1-octen-3-al), 0.5 g. of phosphoric acid, and 121 g. of vinyl ethyl ether are heated together for 3 hours at 150° C. After working up according to the process of Example 19, including distillation under high vacuum, 5,9-dimethyl-4-decen-1-al is obtained as a colorless oil of boiling point 61°/0.06 mm.; $n_D^{20}$=1.4682. Odor: pleasantly herbaceous-fatty, lightly fruity.

EXAMPLE 25

In a flask fitted with a Vigreux column under a nitrogen atmosphere, a mixture of 128 g. of 3,5-dimethyl-1-hexen-3-ol, 0.6 g. of phosphoric acid, and 188 g. of enanthaldehyde diethylacetal are heated together so that the temperature at the top of the column does not exceed 100° C.; bath temperature: 150–180° C. The heating is continued until the theoretical quantity of ethyl alcohol (2 mols) splits off, which takes about 2 hours. Then the residue is neutralized with 2.4 ml. of triethylamine and distilled in a 120° C. bath. First there is obtained under the vacuum of a water pump 30 g. of forerun after which the main portion is distilled under vacuum. 2-pentyl-5,7-dimethyl-4-octen-1-al is obtained at a boiling point of 79°/0.06 mm.; $n_D^{20}=1.4533$. Odor: mild and fresh, herbaceous.

EXAMPLE 26

In a pressure-vessel, 131 g. of methoxylinalool (3,7-dimethyl-7-methoxy-1-octen-3-ol), 0.4 g. of phosphoric acid, and 106 g. of vinyl ethyl ether are heated together for 30 minutes at 180° C. The cooled mixture is neutralized with 1.2 ml. of triethylamine and the resulting acetaldehyde diethylacetal is distilled off at 15 mm. The residue is stirred for 30 minutes with a solution of 350 g. of sodium sulfite in 1300 ml. of water, whereafter glacial acetic acid is added until a pH of 7 is obtained. Then the portion insoluble in the bisulfite solution is removed with ether and the aqueous solution of the aldehyde treated with sodium hydroxide solution. The aqueous solution is extracted again with ether and the ether solution evaporated to yield 5,9-dimethyl-9-methoxy-4-decen-1-al, which is then purified further through distillation; boiling point 79°/0.07 mm.; $n_D^{20}=1.4582$. Odor: similar to 5,9-dimethyl-9-hydroxy-4-decen-1-al.

The methoxylinalool used as the starting material is obtained by the addition of methanol to 6-methyl-5-hepten-2-one, reacting the obtained 6-methyl-6-methoxy-2-heptanone with sodium acetylide in liquid ammonia and partially hydrogenating the obtained methoxydehydrolinalool to methoxylinalool.

EXAMPLE 27

In a pressure-vessel, 171 g. of hydroxylinalool (3,7-dimethyl-1-octen-3,7-diol), 0.6 g. of phosphoric acid, and 240 g. of vinyl ethyl ether are heated together for 30 minutes at 180° C. Thereafter the mixture is neutralized with 2.4 ml. of triethylamine and the resulting acetaldehyde diethylacetal is distilled off at a 100° bath temperature at 14 mm. pressure. The distillation residue is stirred for one hour with a solution of 500 g. of sodium sulfite in 2000 ml. of water and the pH of the mixture then adjusted with glacial acetic acid to 7. Then the nonaldehydic portion is extracted with ether after which the aldehyde portion is freed from the aqueous solution with 1000 ml. of 30 percent sodium hydroxide solution. The mixture is extracted with ether, the ether solution washed with sodium bicarbonate solution, and the ether evaporated off. The residue is treated with 200 ml. of 10 percent sulfuric acid and 500 ml. of acetone and allowed to stand overnight. The next day the mixture is diluted with 2000 ml. of water and extracted with ether 5 times. The ether solutions are washed with sodium bicarbonate solution and the ether evaporated off. Crude 5,9-dimethyl-9-hydroxy-4-decen-1-al is obtained as a residue which can be purified by distillation under high vacuum. Boiling point of the pure aldehyde: 83–85°/0.03 mm.; $n_D^{20}=1.4698$. Odor: pleasantly fruity and smoky fatty. Good persistence.

The hydroxylinalool used as the starting material can be obtained by the addition of water to 3,7-dimethyl-6-ocen-1-yn-3-ol (dehydrolinalool) and partially hydrogenating the resulting hydroxydehydrolinalool.

EXAMPLE 28

In a pressure-vessel, 79 g. of 3-methyl-5-acetoxy-1-penten-3-ol, 0.3 g. of phosphoric acid, and 76 g. of vinyl ethyl ether are heated together for 30 minutes at 180° C. After working up according to the process of Example 19, including distillation under high vacuum, pure 5-methyl-7-acetoxy-4-hepten-1-al is obtained as a colorless oil; boiling point 70–72°/0.1 mm.; $n_D^{20}=1.4520$. Odor: fresh-fruity, lightly fatty.

The 3-methyl-5-acetoxy-1-penten-3-ol used as the starting material is obtained by partially hydrogenating 3-methyl-5-hydroxy-1-pentyn-3-ol and acetylating the 5-hydroxy group of the obtained penten-diol.

EXAMPLE 29

148 g. of 3-phenyl-1-buten-3-ol are mixed with 0.5 g. of phosphoric acid and 152 g. of vinyl ethyl ether in a pressure-vessel. Thereupon a gauge pressure of 2 atm. of nitrogen is produced in the pressure-vessel and the mixture heated to 200° C. in the course of 1.5 hours. Then the mixture is cooled to room temperature, neutralized with 1.5 ml. of triethylamine and the resulting acetaldehyde diethylacetal is distilled off (bath temperature 50° C.). The remaining crude 5-phenyl-4-hexen-1-al (175 g.) is stirred with a solution of 220 g. of sodium sulfite in 2200 ml. of water for 30 minutes. The pH is adjusted to 7 by the addition of acetic acid. The non-aldehydic portion is extracted with ether. Then the aldehyde is set free with excess sodium hydroxide solution. The aqueous solution is extracted with ether and the ether solution evaporated to yield 5-phenyl-4-hexen-1-al which is then purified further through distillation; boiling point 70–72°/0.01 mm.; $n_D^{20}=1.5398$.

Odor: balsamic, lightly fatty, reminiscent of hyacinth and cinnamon.

We claim:

1. A process for the preparation of γ,δ-unsaturated carbonyl compounds of the formula:

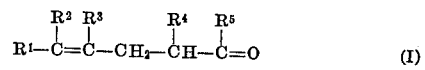

wherein $R^1$ is selected from the group consisting of (a) a saturated hydrocarbon group, (b) an unsaturated hydrocarbon group, (c) an aralkyl group, (d) an aryl group, and (e) an oxygen-containing derivative of (a), (b), and (c) wherein the oxygen is in the form of free hydroxy, esterified hydroxy, wherein the esterifying group is an acyloxy group in which the acyl moiety is from an acid selected from the group consisting of lower alkanoic acids and benzoic acid, and etherified hydroxy selected from the group consisting of lower alkoxy and phenyloxy, and wherein the oxygen atom is attached to an aliphatic carbon atom on said group; $R^2$ is a lower aliphatic hydrocarbon; $R^3$, $R^4$, and $R^5$ are selected from the group consisting of hydrogen and a lower aliphatic hydrocarbon group; and wherein $R^1$ taken together with $R_2$ can form a carbocyclic ring, and $R^4$ taken together with $R^5$ can form a carbocyclic ring; comprising the steps of reacting a tertiary allyl alcohol of the formula:

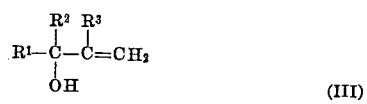

wherein $R^1$, $R^2$, and $R^3$ have the above meaning, in the presence of an acidic catalyst at a temperature from about 50° C. to about 200° C. with a compound selected from the group consisting of:

(a) an enol ether of the formula:

and
(b) a compound of the formula:

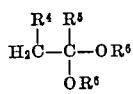
(IVb)

wherein in the Formula IVa and IVb $R^6$ is an alkyl group and $R^4$ and $R^5$ have the meaning given above.

2. A process according to claim 1 wherein the acidic catalyst is phosphoric acid.

3. A process according to claim 1 wherein the reaction is carried out under superatmospheric pressure.

4. A process according to claim 1 wherein at least 2 moles of enol ether are used per mole of allyl alcohol.

References Cited

UNITED STATES PATENTS

| | | | |
|---|---|---|---|
| 3,029,287 | 4/1962 | Marbet | 260—593 |
| 2,849,491 | 8/1958 | Surmatis | 260—593 |
| 2,841,620 | 7/1958 | Colaianni | 260—593 |

OTHER REFERENCES

Beilstein: 2nd supplement, vol. 1., System No. 1–151, p. 802, No. 7.

Fieser: Organic Chemistry, 2nd ed., p. 78 (1950).

LEON ZITVER, *Primary Examiner*.

R. H. LILES, *Assistant Examiner*.

U.S. Cl. X.R.

167—94: 260—491, 586, 593, 594, 598, 599, 601, 602